(12) United States Patent
Kamijo

(10) Patent No.: US 6,523,054 B1
(45) Date of Patent: Feb. 18, 2003

(54) GALOIS FIELD ARITHMETIC PROCESSOR

(75) Inventor: Shunsuke Kamijo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/437,473

(22) Filed: Nov. 10, 1999

(30) Foreign Application Priority Data

Dec. 4, 1998 (JP) .......................................... 10-345463

(51) Int. Cl.$^7$ .............................................. G06F 7/72
(52) U.S. Cl. ................................................... 708/492
(58) Field of Search ...................... 708/492; 714/781, 714/784

(56) References Cited

U.S. PATENT DOCUMENTS

| | | | |
|---|---|---|---|
| 5,983,389 A | * 11/1999 | Shimizu | 714/781 |
| 6,134,572 A | * 10/2000 | Wolf et al. | 708/492 |
| 6,141,786 A | * 10/2000 | Cox et al. | 708/492 |
| 6,199,086 B1 | * 3/2001 | Dworkin et al. | 380/28 |
| 6,199,087 B1 | * 3/2001 | Blake et al. | 708/492 |
| 6,341,297 B1 | * 1/2002 | Tezuka | 708/491 |

FOREIGN PATENT DOCUMENTS

| | | |
|---|---|---|
| JP | 55-4623 | 1/1980 |
| JP | 60-230719 | 11/1985 |
| JP | 62-268215 | 11/1987 |
| JP | 63-276923 | 11/1988 |

OTHER PUBLICATIONS

Hansen, Craig, MicroUnity Systems Engineering, Inc. "Architecture of a Broadband Mediaprocessor", COMPCON 96, Feb. 25, 1996, pp. 1–7.

Robinson, Tim, et al., MicroUnity Systems Engineering, Inc. "Multi–Gigabyte/sec DRAM with the MicroUnity MediaChannel™ Interface", COMPCON 96, Feb. 25, 1996, pp. 1–4.

Abbott, Curtis, et al., MicroUnity Systems Engineering, Inc. "Broadband Algorithms with the MicroUnity Mediaprocessor", COMPCON 96, Feb. 25, 1996, pp. 1–6.

* cited by examiner

*Primary Examiner*—David H. Malzahn
(74) *Attorney, Agent, or Firm*—Staas & Halsey LLP

(57) ABSTRACT

A practical Galois field arithmetic processor capable of high-speed operation with a simple configuration is disclosed. The processor comprises an instruction decoder, an arithmetic unit including a Galois field vector adder, a Galois field vector multiplier and a Galois exponent adder-subtractor for executing the Galois field arithmetic operation on first and second operands. In the case where the arithmetic unit includes at least a Galois field vector adder and a Galois field vector multiplier, an exponent-vector conversion circuit is provided for converting the second operand from an exponential expression into a vectorial expression, and an instruction is provided for performing the Galois field operation on the vectorially expressed first operand and the exponentially expressed second operand. With this configuration, in the case where the vectorially expressed data is input as the first operand and the exponentially expressed data is input as the second operand, the second operand is converted into a vectorial expression by the conversion circuit, after which the arithmetic operation is performed in the Galois field vector adder or the Galois vector multiplier.

38 Claims, 11 Drawing Sheets

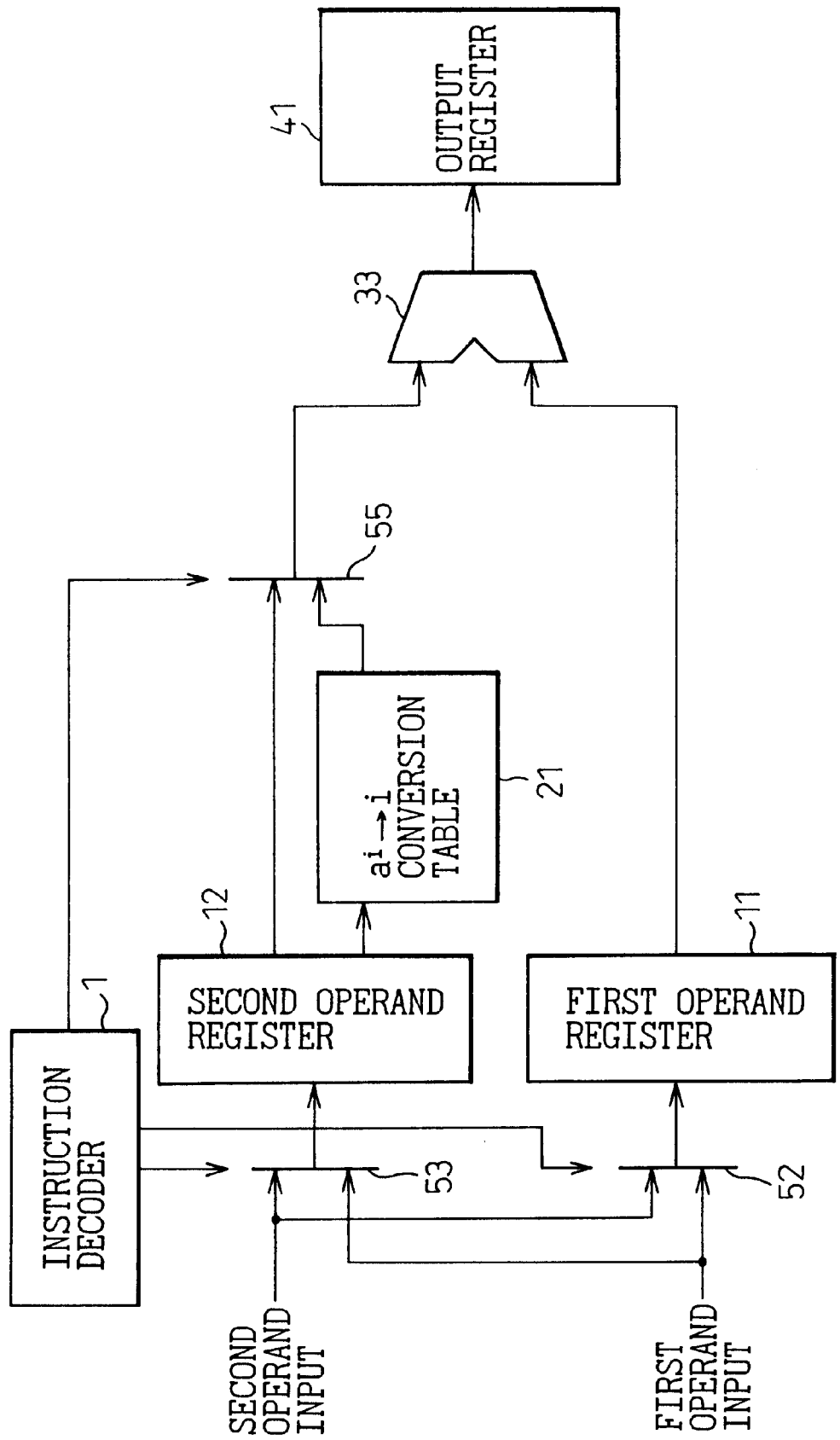

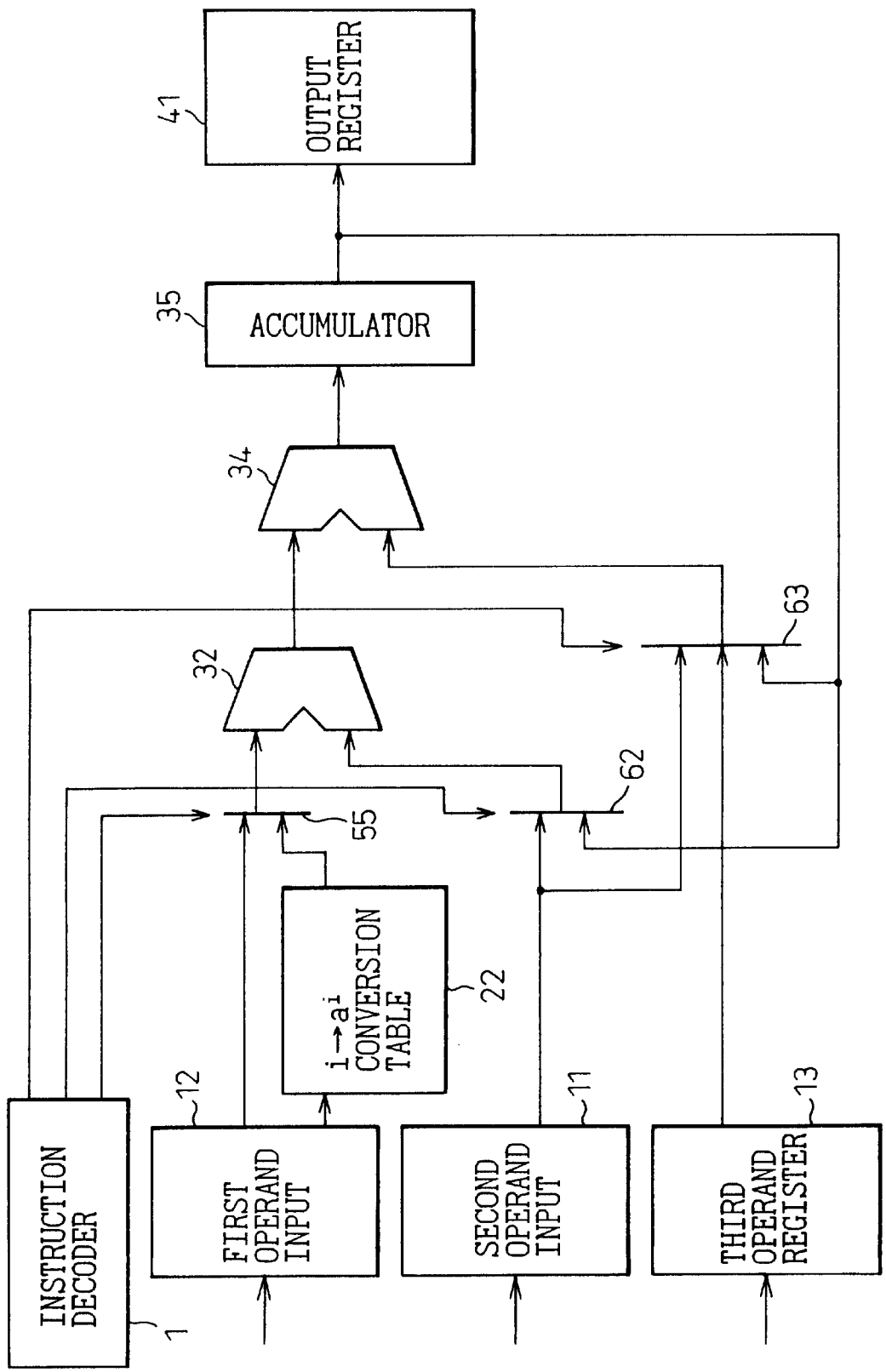

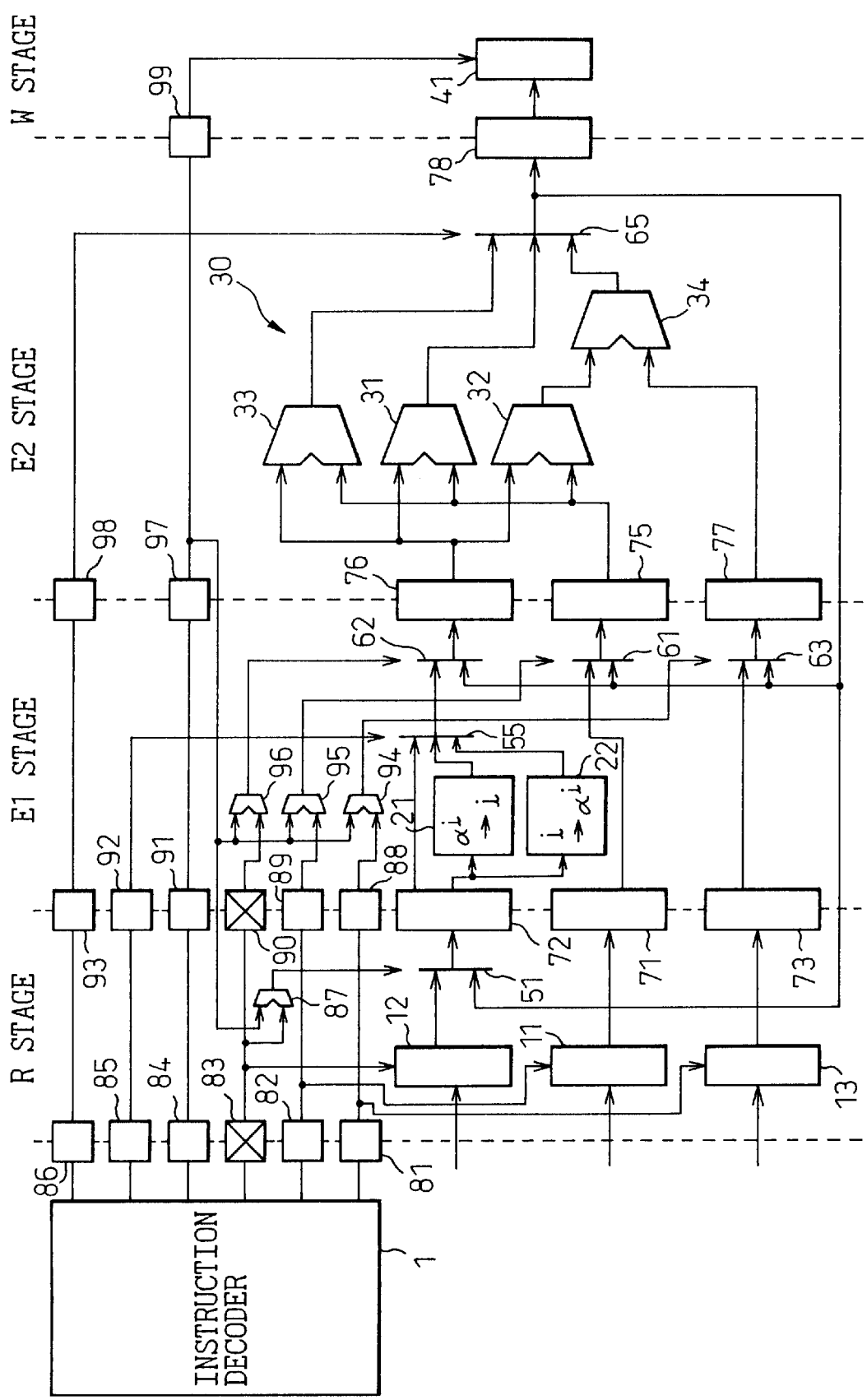

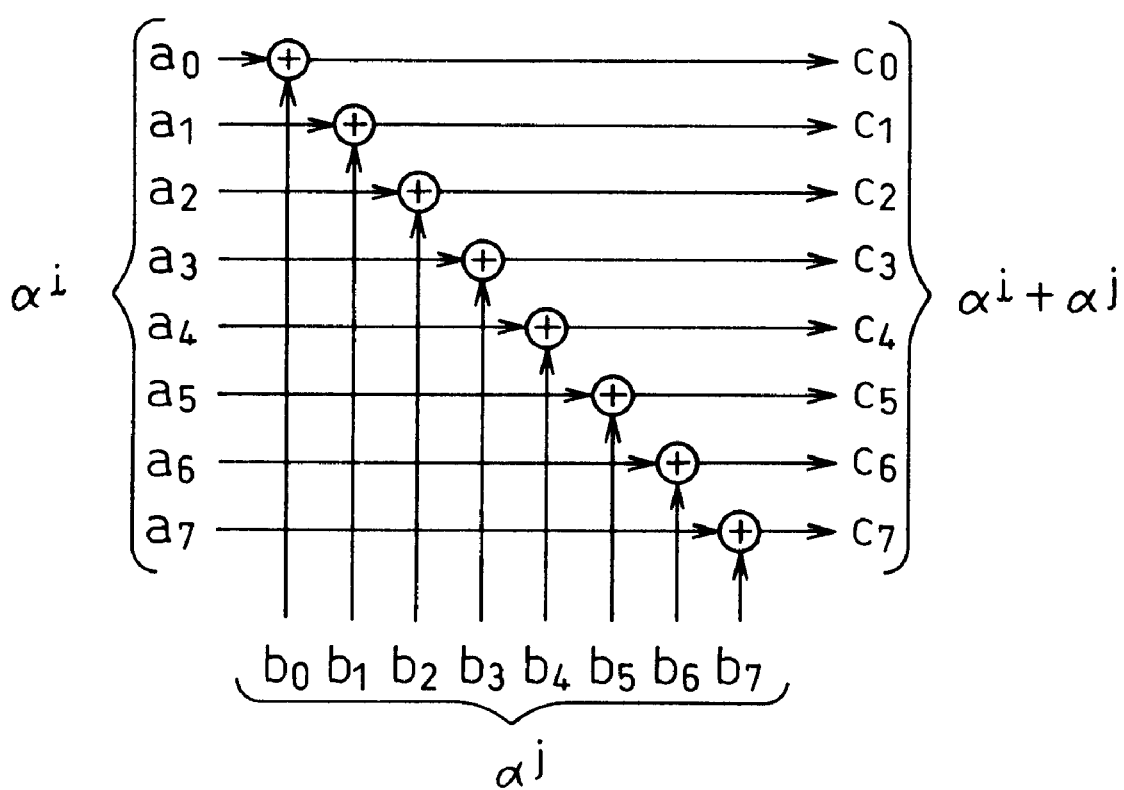

Fig.7

FIRST INSTRUCTION:    E1: EXECUTE TABLE CONVERSION $a = \alpha^i \rightarrow i$ ON OPERAND 2
                                     E1: INPUT O AS OPERAND 1
                                     E2: EXECUTE O-i
SECOND INSTRUCTION:   E1: EXECUTE TABLE CONVERSION $O-i \rightarrow a^{-i}$ ON OPERAND 2
                                     E1: INPUT b AS OPERAND 1
                                     E2: EXECUTE $b*Ga^{-i}$

Fig.8

THIRD INSTRUCTION:   E1: INPUT (b/Ga) AS SECOND OPERAND
                                E1: INPUT c AS FIRST OPERAND
                                E2: EXECUTE (b/Ga)*Gc

Fig.10

```
        i=0
DO (i=0;i<4;i++) {
        MOV    GZ,R1          ; TRANSFER 0 FLAG OF GALOIS ARITHMETIC OPERATION TO R1
        SRL    R1,#1,R1       ; SHIFT R1 ONE BIT DOWNWARD LOGICALLY AND SET THE
                                SHIFTED-OUT BIT IN CARRY FLAG
        BRNC   Lable          ; BRANCH WHEN CARRY FLAG IS NOT 1
        STB    R2,@men        ; STORE LEAST SIGNIFICANT BIT OF R2 IN MEMORY
        @mem=@mem+1           ; INCREMENT MEMORY ADDRESS
Lable:
        SRL    R2,#8,R2       ; SHIFT DATA BY ONE BYTE
}
```

GALOIS FIELD ARITHMETIC PROCESSOR

BACKGROUND OF THE INVENTION

1. Field of the Invention

The present invention relates to a Galois field arithmetic processor capable of performing various Galois field arithmetic operations.

2. Description of the Related Art

In recent years, error correction code techniques have been closely watched from the viewpoint of the digitization of communications and of improved reliability of storage devices. Error correction code techniques are currently used in modem communications and storing data in storage media such as CDs. Especially in the 21th century when the extension of the digital TV broadcasting is expected, error correction code techniques will become indispensable.

The nucleus of the error correction code technique is the arithmetic operation of the Galois field $GF(2^8)$. It is expected that the Reed-Solomon code of the Galois field $GF(2^8)$, for example, will be employed in the standard specification of ADSL and satellite broadcasting and further for digital TV systems using terrestrial transmission.

In common practice, the coder and decoder for performing a Galois arithmetic operation have conventionally been realized with a dedicated circuit. However, the dedicated circuit poses the problem that signals of different specifications cannot be handled successfully. The error correction code has different code lengths and different multiplicities for different applications, and therefore the use of a dedicated circuit for this purpose encounters difficulty in conforming with various specifications.

No available processor has a set of Galois field operation commands. In recent years, however, a Galois field arithmetic processor has been developed for performing a part of the process. This processor is incapable of decoding a Reed-Solomon code in its entirety but can only execute a part of the process. As a result, only one of either the multiplication of the Galois field vector expression or the multiplication of the exponential expression is supported, and the performance of the required process necessitates various pre-processing of the data input to the processor. For versatile programming to be possible with the processor instructions alone, both the performance and an instruction set capable of executing a program in its entirety are required. Cooperation between the processor and a dedicated circuit for performing a part of the process is difficult to control and encounters the problem of a reduced performance. In realizing the processing system for the Galois field operation with a processor, compatibility is required between an increased processing speed, a circuit scale must be reduced to less than the dedicated circuit and affinity to the existing pipelines must be provided.

For the power operation, on the other hand, the arithmetic operation between exponents with 255 as a modulus such as $(\alpha^i)^j = \alpha^{i*j}$ is a common practice. The syndrome operation, therefore, requires conversion of the operation result for use in the next operation. This process cannot be performed by the processor alone. When the power operation is performed by multiplication between exponents, an increased arithmetic unit size poses a problem. In other words, it is necessary to include a special circuit in the form of an arithmetic multiplier with 255 as a modulus in the Galois field FG $(2^8)$ arithmetic unit, resulting in a great disadvantage from the viewpoint of hardware utilization efficiency.

SUMMARY OF THE INVENTION

The object of the present invention is to realize a practical processor with a simple configuration which solves the problem points described above.

FIG. 1 is a diagram showing a first basic configuration of a Galois field arithmetic processor according to the invention. As shown in FIG. 1, the Galois field arithmetic processor according to the invention has the feature in that a data conversion circuit is arranged to perform the conversion of only one operand, and operands of different expressions can be processed as they are.

Specifically, a Galois field arithmetic processor according to this invention comprises an instruction decoder 1, and an arithmetic unit including a Galois field vector adder 31, a Galois field vector multiplier 32, and a Galois field exponential adder-subtractor 33 for executing the Galois field operation on the first and second operands.

In the case where the arithmetic unit 30 includes at least the Galois field vector adder 31 and the Galois field vector multiplier 32, for example, an exponent-vector conversion circuit 22 for converting the second operand from the exponential expression to the vectorial expression is provided with an instruction for performing the Galois field arithmetic operation on the first operand expressed vectorially and the second operand expressed exponentially. With this configuration, if it is assumed that the data expressed vectorially is input as the first operand and the data expressed exponentially is the second operand, the second operand is converted into a vectorial expression by the conversion circuit, after which the Galois field vector adder or the Galois field vector multiplier performs the arithmetic operation. This function is effective for arithmetically processing $r*G\alpha^i$, for example, from the vectorial expression r and the exponential expression i, and a single instruction can be realized with which to execute the aforementioned operation of the processor.

If it is assumed that a selector 55 is provided for selecting the second operand or the output of the exponent-vector conversion circuit 22 and supplying the choice as a second operand to the arithmetic unit 30, then, both the data vectorially expressed and the data exponentially expressed can be input as the second operand, and the processor can be provided with an instruction for performing the Galois field operation on the two vectorially expressed data. Further, providing a second input data selector 51 for selecting the second operand or the processing result and outputting the choice as the second operand, the arithmetic operation can be repeated on the operation result requiring the conversion.

Also, in the case where the arithmetic unit 30 includes at least a Galois field exponential adder-subtractor 33, a vector-exponent conversion circuit 21 is provided for converting the second operand from a vectorial expression to an exponential expression, with an instruction for performing the Galois field operation on the exponentially expressed first operand and the vectorially expressed second operand. In this configuration, assume that the data exponentially expressed and the data vectorially expressed are input as the first operand and the second operand, respectively. The second operand is converted into an exponential expression by the conversion circuit, after which the Galois field exponential adder-subtractor performs the arithmetic operation. In the case of $GF(2^8)$, the addition-subtraction is conducted, for example, with 255 as a modulus in the following manner.

$$(100+30) \bmod 255 = (130) \bmod 255 = 130$$

$$(200+57) \bmod 255 = (257) \bmod 255 = 2$$

$$(57-200) \bmod 255 = (-143) \bmod 255 = 112$$

This function is effective for processing i+Aj or i−Aj (addition-subtraction between exponents i and j), for example, from the vectorial expression $a(\alpha^i)$ and the exponential expression j, and the operation can be performed by giving a single instruction to the processor. Further, if j=0, the conversion is simply the one from a vectorial expression to an exponential expression.

In similar fashion, assume that a selector 55 is added for selecting either the second operand or the output of the vector-exponent conversion circuit 21, and the result is supplied as the second operand to the arithmetic unit 30. Then, either the exponentially expressed data or the vectorially expressed data can be input as the second operand, and an instruction to the processor can be provided for the Galois field operation on two exponentially expressed data.

In the configuration described above, the conversion table is provided only for one operand, and therefore the expression of the first and second operands is restricted. By selecting the operand to be input, in accordance with a particular expression, however, various operation requirements can be met sufficiently, and no practical problem is posed. The configuration according to the invention requires substantially no conversion for the two operands, and such a requirement, if any, can be met by combining two instructions. In the case where a higher versatility is needed, the two configurations described above are combined in such a manner that the arithmetic unit 30 includes a Galois field vector adder 31, a Galois field vector multiplier 32, a Galois field exponential adder-subtractor 33, a vector-exponent conversion circuit 21 and an exponent-vector conversion circuit 22. Then, a greater multiplicity of operation instructions can be executed. Reference numeral 11 designates a first operand register for holding the first operand temporarily, numeral 12 designates a second operand register for holding the second operand temporarily, numeral 61 a first arithmetic data selector for selecting the output of the first operand register 11 and the previous operation result and outputting it as the first operand to the arithmetic unit 30, numeral 62 a second arithmetic data selector for selecting either the output of the selector 55 or the previous operation result and outputting it as the second operand to the arithmetic unit 30, whereby the operation result can be processed repeatedly without conversion. Also, reference numeral 65 designates a selector for selecting the output of the arithmetic means used.

FIG. 2 is a diagram showing a second basic configuration of a Galois field arithmetic processor according to the invention. In this processor, the arithmetic unit includes a Galois field exponential adder-subtractor 33, a vector-exponent conversion circuit 21 as a conversion table, a first input selector 52 for selecting the first or the second operand input thereto and a second input selector 53 for selecting the first or second operand. This configuration permits the operation of not only i+Aj or i−Aj (addition-subtraction between exponents i and j) but also j+Ai or j−Ai as well when the vectorial expression $a(\alpha^i)$ and the exponential expression j are given. By setting j=0 in the operation j−Ai, the exponential expression of an inverse element to the vectorial expression $a(\alpha^i)$ can be executed with a single instruction. The Galois field division is possible with two instructions, for example, by adding the configuration of FIG. 2 to the configuration of FIG. 1, and inputting, as the second operand in the configuration of FIG. 1, the exponential expression of the inverse element to the vectorial expression a determined as described above. In the prior art, the inverse element of the vectorial expression is determined by providing an inverse element table. However, this table is used only for this purpose, and is increasingly a problem as the circuit size increases. This invention avoids such a problem.

FIG. 3 is a diagram showing a third basic configuration of the Galois field arithmetic processor according to the invention. As shown in FIG. 3, this process has the feature in that a third operand is input, and the arithmetic unit 30 is so configured that the first and second operation data are applied to the Galois field vector multiplier 32 and the output of the Galois field vector multiplier 32 and the third operand are output to the Galois field vector adder 34. The configuration of FIG. 3 further includes an accumulator 35 for temporarily holding the output of the Galois field vector adder 34, a first operand selector 62 for selecting the first operand and the output of the accumulator 35 and outputting the choice as the first operand to the Galois field vector multiplier 32, and a third operand selector 63 for selecting either the third operand or the output of the accumulator 35 and outputting the choice as the third operand to the Galois field vector adder 34. Also, the third operand register 13 temporarily holds the third operand.

The configuration of FIG. 3 makes possible the arithmetic operation such as (first operand)*G(second operand)+G(third operand)→first operand, or the sum of normal products such as (first operand)*G(second operand). The syndrome operation performed for error correction in the Reed-Solomon code, for example, requires the following arithmetic operation.

$$S_3 = r_{n-1} * G\alpha^{(n-1)i} + Gr_{n-2} * G\alpha^{(n-2)i} + G \ldots + Gr_1\alpha^i + Gr0$$

$$= ( \ldots ((r_{n-1} * G\alpha^i + Gr_{n-2}) * G\alpha^i + \ldots + Gr_i) * G\alpha^i + Gr_0$$

In this arithmetic operation, the part of the operation "(first operand)*G(second operand)+G (third operand) →first operand" is effective. In this operation, $\alpha^i$ is given as a vectorial expression or as an exponential expression of the Galois field $GF(2^8)$, to either of which the present invention is applicable. This operation eliminates the need of the third operand selector 63, although the provision of the third operand selector 63 makes normal operation of the sum of products possible. In such a case, the first operand selector 62 is not necessary. The chain search for error correction in the Reed-Solomon code is an operation of substituting into polynomials and can be performed by the operation of the sum of products.

The accumulator 35 included in the configuration of FIG. 3 may be replaced with a selector for selecting the first operand and the operation result or a selector for selecting the third operand and the operation result, and the operation result may be returned as the first or third operand.

In the Galois field arithmetic processor having the conversion table as mentioned above, a high operation speed can be achieved by dividing the conversion process and the arithmetic process with the arithmetic unit into two stages and performing them concurrently by pipelining.

The pipelining process requires a temporary holding register including a flip-flop or the like for holding the data temporarily in the connection of each stage. The instruction decoder 1 outputs the control data for controlling such temporary holding registers. Further, in the case where a feedback mechanism having a selector for returning the operation result as the second operand is provided in order to perform the repetitive operations using the previous operation result, the control data for this feedback mechanism is also output from the instruction decoder 1. Also, for sequentially transmitting the control data to the stages corresponding to each temporary holding register and the selector of the feedback mechanism, a control decision circuit is configured with a transmission register. The control decision circuit decides whether control data are for controlling a corresponding register or selector and in accordance with the decision, generates a control signal for controlling the register or selector, as the case may be. In the case where the operation result is used as the next second operand, the conversion may or may not be required. In such a case, a stage flag indicating the presence or absence of the processing in the first stage is incorporated in the control data of the selector of the feedback mechanism. Thus, the control decision circuit corresponding to the feedback mechanism generates a control signal for bypassing the process of the first stage in accordance with the stage flag status.

Also in the operation of $GF(2^m)$, the exponent constituting an operand never exceeds m bits, nor does the result of addition/subtraction exceed m bits as it is performed with $2^m-1$ as a modulus. The vector operation of course involves m bits, and therefore the data width is kept fixed in the operation. Thus, m-bit operations in the number of n can be concurrently performed with a fixed data width of m×n. Assume, for example, that the operation of the Reed-Solomon code of $GF(2^8)$ is incorporated in a processor having a data (register) width of 32 bits. The operation can be carried out in four parallel stages without changing the register port, the operand bus, the result bus or the bypass mechanism but simply by arranging the conversion tables and the arithmetic means in four parallel stages.

In the n parallel operations described above, it is desirable to provide a flag storage register for storing n-bit flags in continuous areas indicating that the result of operation in n arithmetic means is zero. In this way, as compared with the case where the flags are distributed, a program can be realized which facilitates the substitution operation in the chain search.

Also, an accumulation flag is desirably provided for accumulating the zero flags by calculating the logic sum of the output of the Galois field vector adder and the previous output thereof. In the n parallel operations as described above, n accumulation flags are provided and an immediate value copy register is desirably provided for storing arbitrary m-bit data at n points, indicated as the immediate value of the second operand. As a result, the division of polynomials required for the Euclidean algorithm is facilitated in the coding and decoding of the Reed-Solomon code.

Also, in the case where the conversion circuit described above is realized by a table in a memory, a memory built in the processor may be used. When n processes are conducted in parallel, however, n different addresses are required to be input. In view of this, n memories with a data width m are used to constitute n banks and hence n accessible memories. At the same time, a memory having a data width m×n accessible by a common address is constituted.

The exponential expression of $2^m-1$ desirably corresponds to the vectorial expression of zero in the Galois field arithmetic processor, while $2^m-1$ is desirably output in response to an input of $2^m-1$ in the Galois field adder-subtractor. The zero vector of $GF(2^m)$ cannot be expressed by the exponential indication of $\alpha^i$.

Assuming that $2^m-1$ is t in $GF(2^m)$, $\alpha^t=\alpha^0$. This is inconvenient for the operation. For example, if it is considered that the chain search of $GF(2^m)$ in the Reed-Solomon decode algorithm in which four substitution operations of polynomials are executed in parallel, and when the result becomes zero as in the case described above, the flag is stored in the flag storage register. Substituting units of 4k to 4k+3 into i, i=252, 253, 254, 255 are processed with a single instruction. If i =0 is the resolution of the search, i=255 is also stored in memory as a resolution. Excluding this requires a program for processing i=255 specially. In the case where i=255 is converted into a vector of zero, on the other hand, the substitution operation in the chain search always results in $\alpha^0$=(00000001) and zero is basically excluded. Thus the search is possible without forming a program for excluding i=255.

When converting the vectorial expression of zero into an exponential expression, on the other hand, an arrangement may be made not to output data. It is more useful, however, to output an established value. In the case where 255 is input to an operand register in the addition of exponents, for example, the output may be set to 255 regardless of the result of addition. In the multiplication of the Galois field $GF(2^8)$, this corresponds to the fact that the result of multiplication of the 0 vector is always the zero vector. Also in the exponential subtraction, the result of inputting 255 to any one of the operand registers may be set to 255. In the case where 255 is input as a minuend, the result of dividing the zero vector by whatever value becomes 0 vector. In the case where 255 is input as a subtrahend, on the other hand, the division by zero is not definable.

A Galois field arithmetic processor according to another aspect of the invention comprises an arithmetic unit including an instruction decoder, a first Galois field vector multiplier having two input terminals each supplied with a first operand and a second Galois field vector multiplier having two input terminals supplied with the first operand and the the result of arithmetic operation, respectively, a one-bit shifter for counting the number of times indicated by the second operand, an accumulator for temporarily holding the output of the second Galois field vector multiplier and supplying it to the other input terminal of the second Galois field vector multiplier, a first input selector for selecting the first operand or the output of the first Galois field vector multiplier, and a second input selector for selecting the second operand or the output of the one-bit shifter and outputting it as the second operand. This Galois field arithmetic processor is suitable for determining $a^p$ from the vectorially expressed a and the number of power p.

Also in this configuration, n operations having a data width m can be performed in parallel. Also, by inputting a as the first operand and the exponent 2 as the second operand, the conversion from an exponential expression to a vectorial expression can be performed. In the case where this conversion is performed as a table conversion using a memory, the capacity of $2^m \times m$ bits is required, thereby increasing the hardware amount exponentially in accordance with m. Therefore, this configuration is effective especially for a large m.

BRIEF DESCRIPTION OF THE DRAWINGS

The feature and advantages of the Galois field arithmetic processor according to the present invention will be more clearly understood from the following description taken in conjunction with the accompanying drawings, in which:

FIG. 2 is a diagram showing a second basic configuration of the present invention;

FIG. 3 is a diagram showing a third basic configuration of the present invention;

FIG. 4 is a block diagram showing a configuration of a Galois field arithmetic processor according to a first embodiment of the invention;

FIG. 5 is a diagram showing an example configuration of a Galois field vector adder according to an embodiment;

FIG. 7 is a diagram for explaining an example of parallel processing by pipelining according to the first embodiment;

FIG. 8 is a diagram for explaining an example of parallel processing by pipelining according to the first embodiment;

FIG. 10 is a diagram showing an example program for substitution operation according to the second embodiment;

DESCRIPTION OF THE PREFERRED EMBODIMENTS

Figure 1:
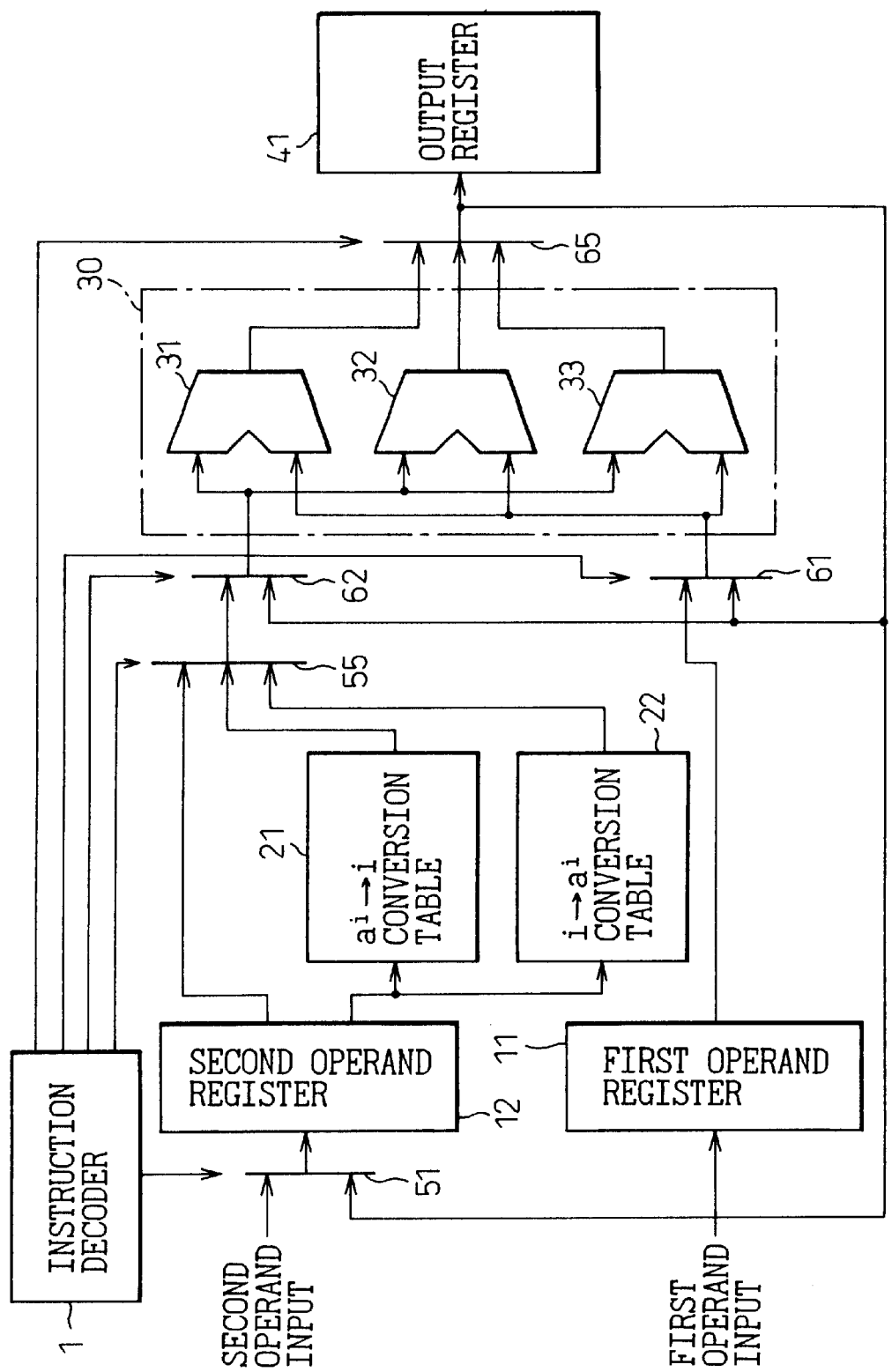
FIG. 1 is a diagram showing a first basic configuration of the present invention.

FIG. 4 is a diagram showing the configuration of a $GF(2^8)$ Galois field arithmetic processor according to a first embodiment of the invention. The processor of the first embodiment is a realization of the basic configurations shown in FIGS. 1 to 3, in which the conversion processing and the arithmetic processing are divided into two stages and performed in parallel.

As shown in FIG. 4, the Galois field arithmetic processor according to the first embodiment comprises an instruction decoder 1, a first operand register 11 supplied with a first input data for holding it temporarily as the first operand supplied to the arithmetic unit, a second operand register 12 supplied with a second input data for holding it temporarily as the second operand supplied to the arithmetic unit, a third operand register 13 supplied with a third input data for holding it temporarily as the third operand supplied to the arithmetic unit, a vector-exponent conversion circuit 21, a vector-exponent conversion circuit 22, an arithmetic unit 30 including a Galois field vector adder 31, a first Galois field vector multiplier 32, a Galois field exponent adder-subtractor 33 and a second Galois field vector multiplier 34, an output register 41, a second operand selector 51, a selector 55, selectors 61 to 63, and a selector 65 for selecting the result of the arithmetic operation in any one of the Galois field vector adder 31, the Galois field exponent adder-subtractor 33 and the second Galois field vector multiplier 34. These component elements have already been described with reference to FIGS. 1 to 3 or have the same function as those component elements described with reference to FIGS. 1 to 3, and therefore will not be described.

The Galois field arithmetic processor according to the first embodiment comprises latches 71 to 73 for temporarily holding the first to third operands between the R and E1 stages, latches 75 to 77 for temporarily holding the first to third operands in the connection between the E1 and E2 stages, and a latch 78 for temporarily holding the result of operation in the E2 stage. These latches 71 to 73, 75 to 78 temporarily hold the output data in the preceding stage to secure the coincidence of the timing of supplying data to the next stage. The signal for controlling the latch operation and the outputs of these latches to the next stage is output from the instruction decoder 1. In the case where a feedback mechanism such as the second operand selector 51 or the selectors 61 to 63 is provided for performing the arithmetic operation repetitively using the result of the preceding arithmetic operations, the control data for the feedback mechanism is also output from the instruction decoder 1. In order to sequentially transmit the control data to each stage corresponding to the latches and the selectors of the feedback mechanism, transmission registers 81 to 86, 88 to 93, 97 to 99 are provided, so that it is determined whether the control data are those for controlling the corresponding latches and selectors, and the control signals for controlling the corresponding latches and selectors are generated in accordance with the result of determination. The use of the result of arithmetic operation as the next second operand may or may not require conversion. In such a case, the control data for the selectors of the feedback mechanism are designed to include a stage flag indicating the presence or absence of the processing in the first stage, and the transmission registers 83, 90 corresponding to the selectors of the feedback mechanism are designed to generate a control signal bypassing the processing in the first stage in accordance with the stage flag. Reference numerals 87, 94 to 96 designate a bypass decision logic for determining whether a given processing is bypassed or not based on the control data containing the stage flag and the control data indicating the timing of bypassing without performing the processing of the particular stage.

Figure 6A:
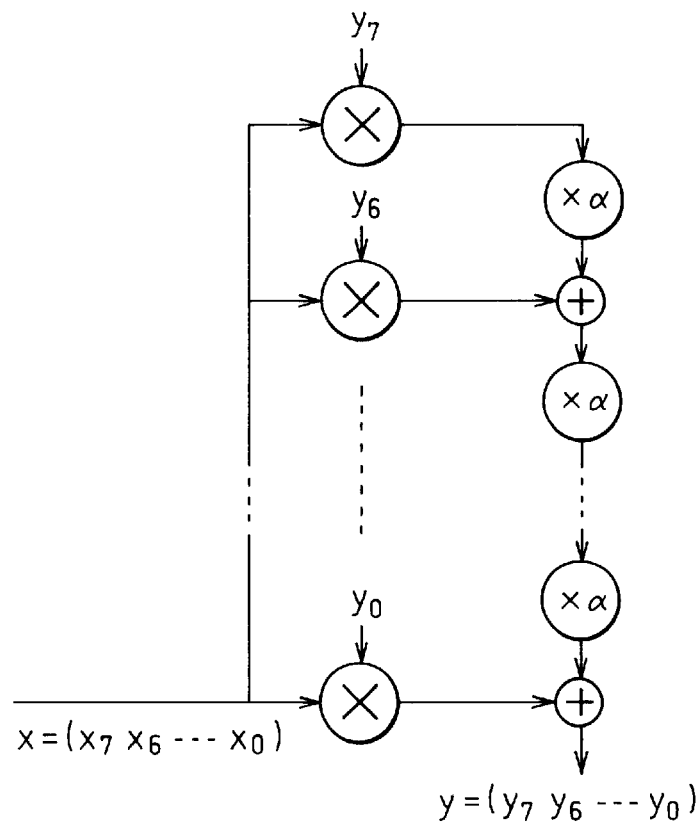
FIGS. 6A and 6B are diagrams showing an example configuration of a Galois field vector multiplier according to an embodiment.
Figure 6B:
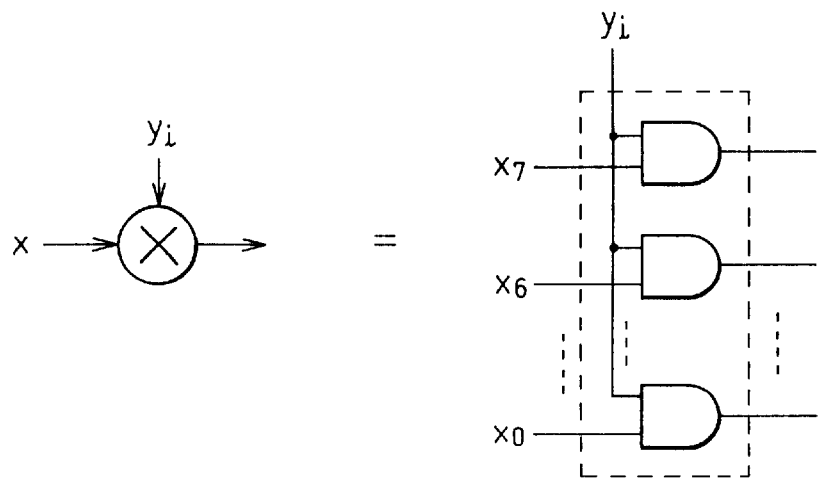

The $GF(2^8)$ Galois field vector adder 31 has a configuration as shown in FIG. 5, for example, and the $GF(2^8)$ Galois field vector multiplier 31 has a configuration as shown in FIGS. 6A and 6B, for example. These configurations are widely known and therefore will not be described. Also, the $GF(2^8)$ Galois field exponent adder-subtractor can be realized by an ordinary adder-subtractor and therefore will not be described.

The Galois field arithmetic processor according to the first embodiment has a configuration of FIGS. 1 and 2 combined. The arithmetic operation is possible, therefore, between the data of the same or different vectorial and exponential expressions. Further, in the case where the result of an arithmetic operation is fed back and used for the next arithmetic operation, the result of the first arithmetic operation can be used as it is or after being converted. In the first embodiment shown in FIG. 4, the first input selector 52 and the second input selector 53, though not shown due to a limited space, are also included as in FIG. 2.

Now, an explanation will be given of the pipelining operation of the Galois field arithmetic processor according to the first embodiment. The result of arithmetic operation is output in the E2 stage. The operand is read in the R stage. The first operand is not subjected to table conversion, and therefore is not used in the E1 stage but in the E2 stage first. Thus, the data bypasses two stage E1 and stage E2. Consider the case in which the vectorial division (b/Ga) of the Galois field $GF(2^m)$ is performed with the two instructions shown in FIG. 7, for example, based on the method of the Galois field division described above. In this case, the use of the result of the first instruction as the second operand of the second instruction means that the process is bypassed from the E2 stage to the R stage. Assume in FIG. 4, for example, that when the one-bit stage flag of the value of the second operand is 1, it is used for the arithmetic operation in the E1 stage, and when the stage flag is 0, it is used in the E2 stage.

In response to the second instruction for division, the table is referred to, and therefore it is the E1 stage that requires the second operand. Thus, the bypass decision logic 87 determines that the bypass is selected when the register number is coincident and the stage flag is 1 at the same time. In the case involved, an interlock of one cycle is required in principle. This interlock is avoided, however, by inserting an instruction not related to the result of arithmetic operation between the two instructions.

Considering the arithmetic operation of (b/Ga)*Gc. In this case, the third instruction of FIG. 8 is required in addition to the two instructions of FIG. 7. If the result of the second instruction is used as the second operand for bypassing to the E2 stage, the interlock is avoided. In FIG. 4, the stage flag is 0, and the bypass decision logic 87 does not detect the bypass, but the stage flag of the bypass decision logic 96 is 1. In the absence of the stage flag, the data would normally bypass the E1 stage resulting in a deteriorated performance due to the unnecessary interlock.

The first and third operands are not required in the E1 stage, and therefore require no stage flag. Thus, the bypass decision logics 94, 95 only compare the register numbers.

Figure 9:
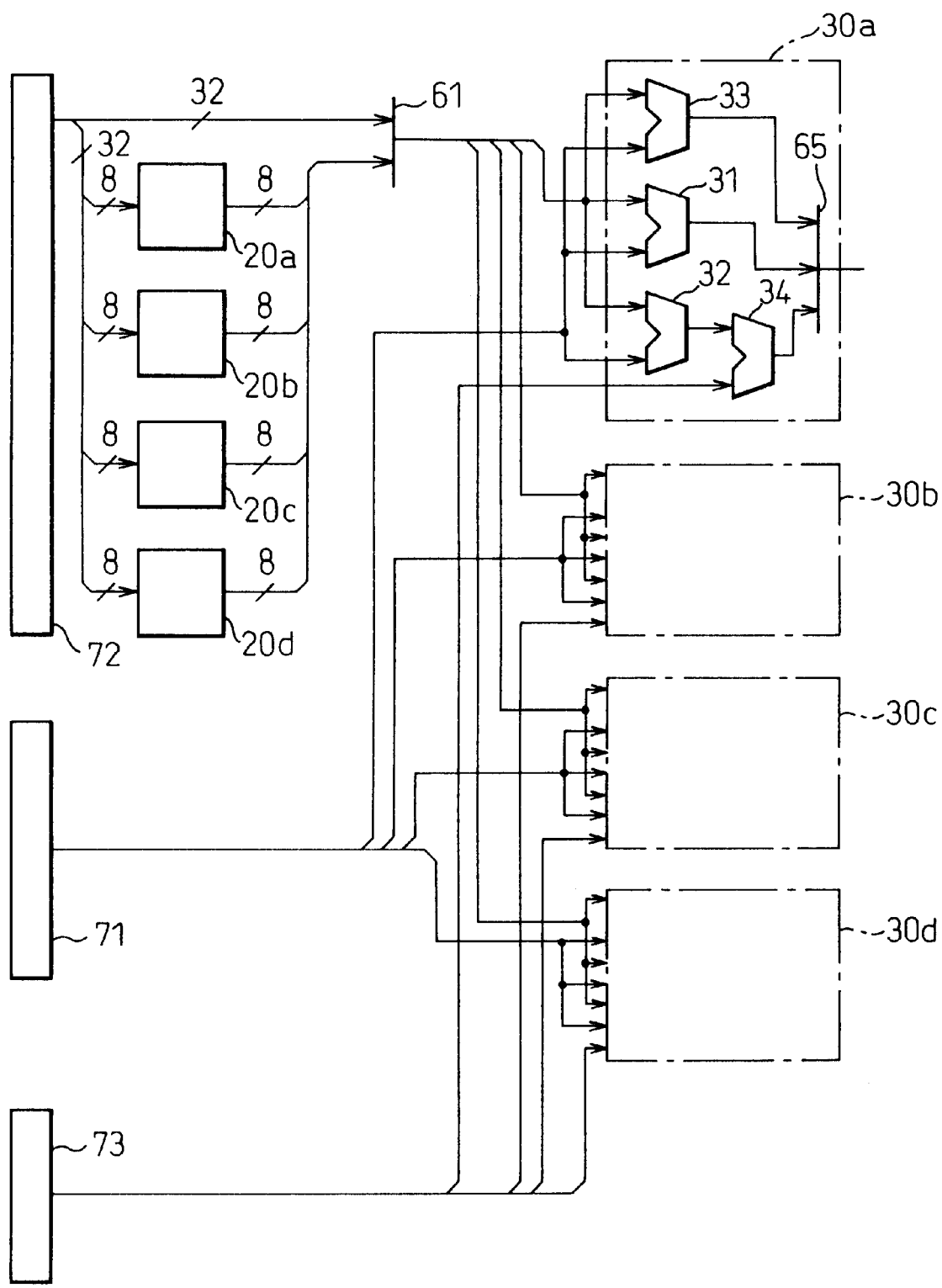
FIG. 9 is a block diagram showing a partial configuration of a Galois field arithmetic processor according to a second embodiment of the invention.

FIG. 9 is a diagram showing a configuration of the data conversion unit and the arithmetic unit of the Galois field arithmetic processor according to the second embodiment of the invention. The Galois field arithmetic processor according to the second embodiment performs four GF($2^8$) operations in parallel. In the case of a 32-bit processor, all of the register port, the operand bus, etc. have a data width of 32 bits. Therefore, it is sufficient that only the data conversion unit and the arithmetic unit can perform the parallel processing of four GF($2^8$) operations. As shown, the data conversion unit has four data conversion units 20a to 20d, and the arithmetic unit 30 has four arithmetic circuits 30a to 30d. Each data conversion unit includes a vector-exponent conversion table for converting a vectorially expressed 8-bit second operand into an exponential expression and an exponent-vector conversion table for converting an exponentially expressed second operand into a vectorial expression. Also, each arithmetic circuit includes an 8-bit first Galois field vector adder 31, a Galois field vector multiplier 32, a Galois field exponent adder-subtractor 33 and a second Galois field vector adder 34. The other component parts are identical to the corresponding parts of the first embodiment, respectively.

The Galois field arithmetic processor according to the second embodiment has the function of storing the zero flag of the result of arithmetic operation in the continuous bits of the flag register not shown. In the case where the result is zero of the substitution into the polynomials in the chain search of the Reed-Solomon decode processing algorithm, the process is required for storing the substituted $\alpha^i$ or i. In the process, if the zero flag is stored in the continuous bits of the flag register, the program as shown in FIG. 10 is possible. This program can facilitate the chain search process as compared with when the flag is distributed.

Now, an explanation will be given of the case in which a polynomial division is conducted in the Galois field arithmetic processor according to the first and second embodiments. This Galois field arithmetic processor has the function of an accumulation flag for producing a logic sum between the remainder of a division and the preceding arithmetic operation. For example, assume that the dividend polynomial and the divisor polynomial are expressed as Dividend polynomial: $b_{p-1}X^{p-1}+Gb_{p-2}X^{p-2}+G \ldots +Gb_1X^1+Gb_0$ Divisor polynomial: $a_{q-1}X^{q-1}+Ga_{q-2}X^{q-2}+G \ldots +Ga_1X^1+Ga_0$ In this algorithm for polynomial division, $b_{p-1}/a_{q-1}=q$ is determined first, then all the coefficients of the divisor polynomial are multiplied by q and subtracted from the coefficients of the dividend polynomial thereby to determine $b_{p-1}+Gq*Ga_{q-1}$, $b_{p-2}+Gq*Ga_{q-2}$, etc. This process is repeated with the number of power reduced one by one. In this way, the polynomial division can be executed. At the same time, whether the remainder of the polynomial division is zero or not can be determined according to whether all the flags in one loop are reduced to zero or not. Thus the accumulation flag can be used for the determination.

Also, consider the case where the polynomial division described above is conducted for n digits at a time by the Galois field arithmetic processor according to the second embodiment. In the case where the 8-bit Reed-Solomon decode operation is performed on a 32-bit data bus, for example, four digits are handled at a time. In this case, too, the zero flag can be accumulated for 32 bits at a time. The function is required, however, to copy $b_{p-1}/a_{q-1}$ to the coefficients for four digits (32 bits) once $b_{p-1}/a_{q-1}$ is determined.

Figure 11:
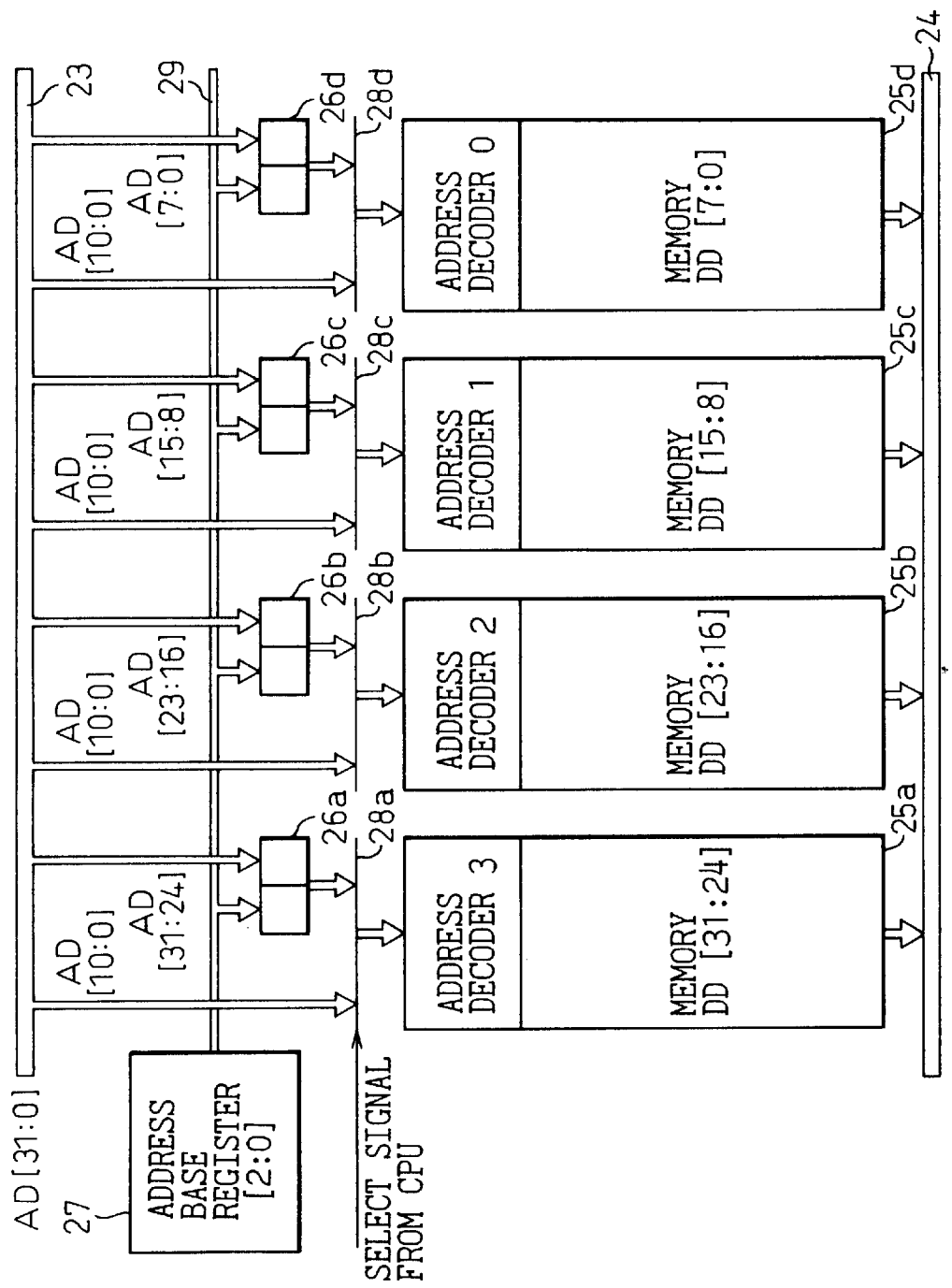
FIG. 11 is a diagram showing a memory configuration of a conversion table according to the second embodiment.

FIG. 11 is a diagram showing a memory configuration for realizing four data conversion units 20a to 20d of the Galois field arithmetic processor according to the second embodiment. In the case where the conversion between the exponential expression and the vectorial expression is realized with a table, a ROM may be built in the pipeline as shown. Nevertheless, the processor usually has a memory built therein, and therefore it is more cost effective if the built-in memory is used for referring to the table. Further, the CPU structure is complicated and the problem of a reduced operating frequency is caused by building a ROM or the like in the data bus of the CPU. For these reasons, it is preferable to use a built-in memory for referring to the table. A problem is encountered, however, in the case where the table conversion of GF($2^8$) is performed by n parallel operations with a configuration as shown in FIG. 9. This is by reason of the fact that the data width of the processor is 32 bits, and the memory is used with a data width of 32 bits. In the case where four 8-bit table refer operations are performed in parallel, therefore, the table refer operation is required for an address of eight bits each. In order to solve this problem, according to the second embodiment, the memory configuration shown in FIG. 11 is used.

Assume, for example, that the table conversion of the Reed-Solomon code of GF($2^8$) is performed in parallel operations using an 8k-byte built-in memory. The operand providing a base of table conversion is given as 8 bits×4 for a total of 32 bits. For each eight bits to refer to a different address, the memory is segmented into four banks 25a to 25d. In normal memory reference, an 11-bit common address is output to the address bus 23, and input to each bank through the selectors 28a to 28d. In response, each bank outputs data of DD[31:24], DD[23:16], DD[15:8], DD[7:0] to the data bus 24. When referring to the table of the Galois field, the operand described above is output to the address bus 23, and eight bit addresses of AD[31:24], AD[23:16], AD[15:8], AD[7:0] are applied to each bank through the selectors 28a to 28d, respectively. In the process, a 3-bit address is added to the most significant digit of the address as a base address from the address base register 27, thus providing a freedom of the table position in the memory. In accordance with these four independent addresses, the data of DD[31:24], DD[23:16], DD[15:8], DD[7:0] are independently read out and output to the data bus 24.

Figure 12:
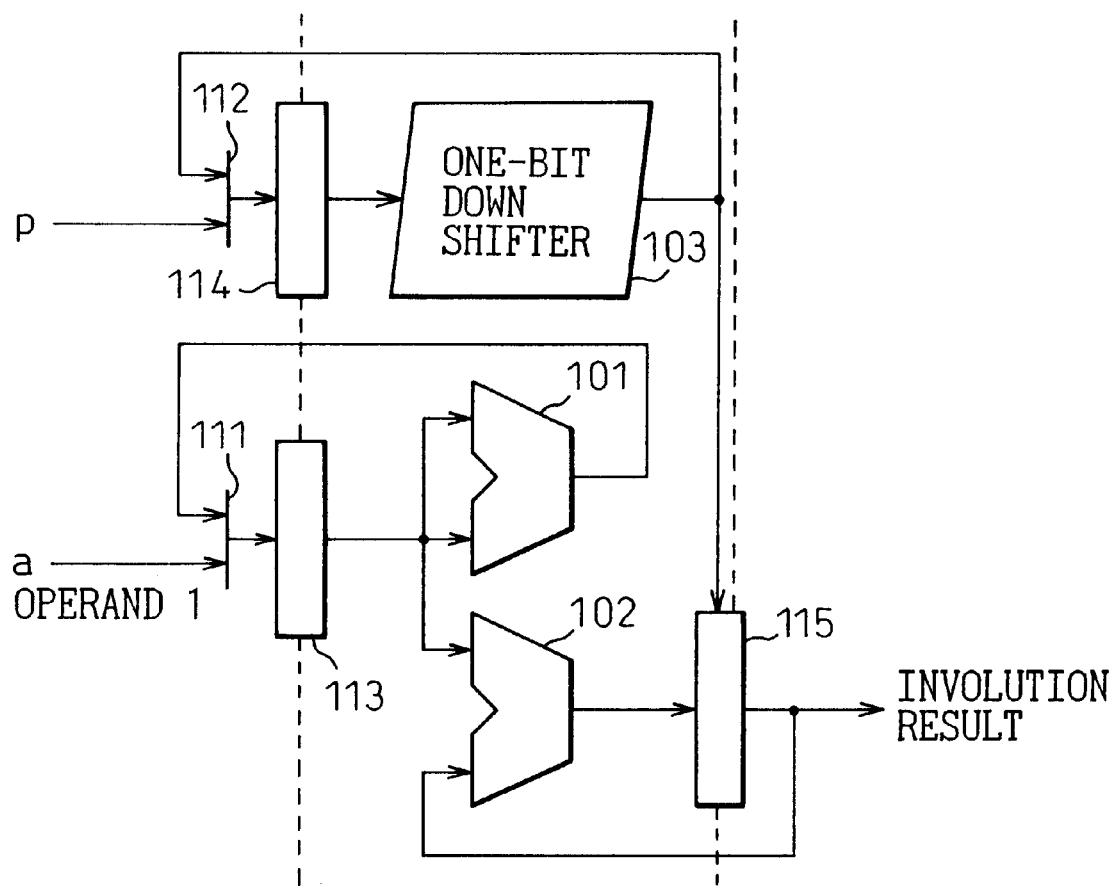
FIG. 12 is a block diagram showing a partial configuration of a Galois field arithmetic processor according to a third embodiment of the invention.

FIG. 12 is a diagram showing a configuration of the arithmetic unit of the Galois field arithmetic processor according to a third embodiment of the invention. This arithmetic unit repeats multiplications of the first operand the number of times indicated by the second operand.

As shown in FIG. 12, the arithmetic unit includes a first Galois field vector multiplier 101 and a second Galois field vector multiplier 102. The two input terminals of the first Galois field vector multiplier 101 are supplied with the output of the latch 113, and one of the input terminals of the second Galois field vector multiplier 102 is supplied with the output of the latch 113, while the other input terminal thereof is supplied with the output of the latch 115 for temporarily holding the output of the second Galois field vector multiplier 102. The output of the latch 115 is the result of involution. The input of the latch 113 has a selector 111 for selecting any one of the first operand from an operand register not shown and the output of the first Galois field vector multiplier 101. Further, there is provided a one-bit down shifter 103 for shifting the output of the latch 114 to the next lower digit bit by bit, and the input of the latch 114 includes a selector 112 for selecting any one of the second operand from an operand register not shown and the output of the one-bit down shifter 103. As a result, the cycles are counted the number of times designated by the second operand.

In the first cycle, the first and second operands are selected by the selectors 111, 112, and the raised number a is set in the latch 113 while the raising number p is set in the latch 114. In the initial state, on the other hand, the latch 115 is set to $\alpha^0$. This corresponds to (00000001) of the Reed-Solomon code.

The one-bit down shifter 103 shifts the value of the latch 114 to the one-bit lower digit, and when the value shifted reaches 1, enables the latch 115. Taking the Reed-Solomon code as an example, the one-bit lower shifter 103 is configured with 8-bit logic shifts. The eight-bit result of shifting is fed back to the input of the latch 114, and in the second and subsequent cycles, the signal thus fed back is selectively input to the latch 114.

The first Galois field vector multiplier 101 determines a to the $2^i$th power sequentially from a1 to a2 to a4 to a8 and so on for each cycle, and selectively inputs the result thereof to the latch 113. The second Galois field vector multiplier 102 multiplies the values of the latches 113 and 115. When the kth bit shifts out from the one-bit down shifter 103, the value input to the second Galois field vector multiplier 102 from the latch 113 becomes a to the $2^k$th power, and when the shifted-out bit is 1, the result of multiplication is held in the latch 15 and $a^p$ is determined.

In the arithmetic operation of the Galois field GF($2^m$), the data width is always m bits and unlike the mathematic operation, is accommodated within predetermined digits. As a result, as in the case mentioned above, n parallel operations can be performed with the data bus of m×n bits.

In the third embodiment, the first operand is input as $\alpha$, and an exponent is input as the second operand. Then, the conversion is effected from the exponential expression to the vectorial expression. When an attempt is made to carry out this conversion by the table conversion using a memory, the capacity of $2^m \times m$ bits is required, so that the hardware amount increases exponentially. This configuration, therefore, is effective when m is especially large.

The configurations of the first to third embodiments described above may be combined. The instruction sets of the Galois field arithmetic processor realized by a combined configuration of the first to third embodiments are shown in Tables 1 to 3.

TABLE 1

Processor instruction sets (Galois field vector operation)

| | | |
|---|---|---|
| GADDG | r1, r2, r3 | mr [r1] +G mr [r2] → mr [r3] |
| GADDE | r1, r2, r3, | mr [r2] → etov(mr [r2]) Exponent converted to vector by reference to table<br>mr [r1] +G etov(mr [r2]) → mr [r3] |
| GMULG | r1, r2, r3 | mr [r1] ≠G mr [r2] → gacc & mr [r3] |
| GMACG | r1, r2, | mr [r1] ≠G mr [r2] +G gacc → gacc |
| GMADG | r1, r2, r3 | mr [r1] ≠G mr [r2] +G mr [r3] → mr [r3] |
| GMULE | r1, r2, r3, | mr [r2] → etov(mr [r2]) Exponent converted to vector by reference to table<br>mr [r1] ≠G etov(mr [r2]) → gacc & mr [r3] |
| GMACE | r1, r2, r3, | mr [r2] → etov(mr [r2]) Exponent converted to vector by reference to table<br>mr [r1] ≠G etov(mr [r2]) +G gacc → gacc |
| GMADE | r1, r2, r3, | mr [r2] → etov(mr [r2]) Exponent converted to vector by reference to table<br>mr [r1] ≠G etov(mr [r2]) +G mr [r3] → mr [r3] |
| GMULACG | r2, r3, | mr [r2] ≠G gacc → gacc |
| GMACACG | r2, r3, | mr [r2] ≠G gacc +G mr [r3] → gacc |
| GMADACG | r1, r2, r3, | mr [r2] ≠G mr [r1] +G mr [r3] → mr [r1] |
| GMULACE | r2, r3, | mr [r2] → etov(mr [r2]) Exponent converted to vector by reference to table<br>etov(mr [r2]) ≠G gacc → gacc |
| GMACACE | r2, r3, | mr [r2] → etov(mr [r2]) Exponent converted to vector by reference to table<br>etov(mr [r2]) ≠G gacc +G mr [r3] → gacc |
| GMADACE | r2, r3, | mr [r2] → etov(mr [r2]) Exponent converted to vector by reference to table<br>etov(mr [r2]) ≠G mr [r1] +G mr [r3] → mr [r1] |

TABLE 2

Processor instruction sets (Galois field exponential operation)

| | | |
|---|---|---|
| AADDG | r1, r2, r3, | mr [r2] → vtoe(mr [r2]) Vector converted to exponent by reference to table<br>mr [r1] +A vtoe(mr [r2]) → mr [r3] |
| AADDE | r1, r2, r3, | mr [r2] +A → mr [r2] → mr [r3] |
| ASUB1G | r1, r2, r3, | mr [r2] → vtoe(mr [r2]) Vector converted to exponent by reference to table<br>mr [r1] −A vtoe(mr [r2]) → mr [r3] |
| ASUB1E | r1, r2, r3, | mr [r1] −A mr [r2] → mr [r3] |
| ASUB1E1 | r1, imm8, r3, | mr [r1] −A imm8, → mr [r3] |
| ASUB2E1 | r1, imm8, r3, | imm8 → −A mr [r1] → mr [r3] |

TABLE 3

Processor instruction sets (data transfer, copy instruction)

| | | |
|---|---|---|
| PUTGACC | r1, | mr [r1] → gacc |
| GETGACC | r3, | gacc → mr [r3] |
| BCPYI | r1, imm4, r3 | mr [r1]/imm4 → mr [r3]0<br>mr [r1]/imm4 → mr [r3]1<br>mr [r1]/imm4 → mr [r3]2<br>mr [r1]/imm4 → mr [r3]3 |
| BCPY | r1, r2, r3 | mr [r1]/mr [r2] → mr [r3]0<br>mr [r1]/mr [r2] → mr [r3]1<br>mr [r1]/mr [r2] → mr [r3]2<br>mr [r1]/mr [r2] → mr [r3]3 |
| BCUT1 | r1, imm4, r3 | mr [r1]/imm4 → mr [r3]0<br>0x00 → mr [r3]1<br>0x00 → mr [r3]2<br>0x00 → mr [r3]3 |

TABLE 3-continued

Processor instruction sets (data transfer, copy instruction)

| BCUT1 | r1, r2, r3 | mr [r1]/mr [r2] → mr [r3]0 |
| | | 0x00 → mr [r3]1 |
| | | 0x00 → mr [r3]2 |
| | | 0x00 → mr [r3]3 |
| WCUT1 | r1, imm6, r3 | mr [r1] \| mr [r1+1] >> imm6 → mr [r3] |
| WCUT | r1, r2, r3 | mr [r1] \| mr [r1+1] >> mr [r2] → mr [r3] |

Table 1 shows Galois field vector arithmetic instructions, Table 2 shows Galois field exponential operation instructions, and Table 3 shows data transfer and copy instructions. Detailed explanation of each instruction will be omitted.

A brief explanation will be given of the decode processing of the Reed-Solomon code in the Galois field arithmetic processor realized as a combination of the first to third embodiments described above. The first step in the Reed-Solomon decode processing is the syndrome operation. The sum of products with the configuration of FIG. 3 is effective for this operation, and can be easily accomplished by use of GMADE r1, r2, r3 instruction. No error exists if the result of arithmetic operation for all the i's in the syndrome operations is zero. In four parallel arithmetic operations, the result of operation can be easily determined by the program shown in FIG. 10.

In the case where the result of arithmetic operation is not zero, an error position polynomial is introduced. In this process, Euclidean method is used for polynomial division. The polynomial division is facilitated, however, by the function of flag accumulation described above.

Then, the chain search is conducted in search of an error position. In this case, too, the operation of the sum of products is effective. Further, in four parallel operations, the result of arithmetic operation can be easily determined by the program shown in FIG. 10.

As described above, the use of a Galois field arithmetic processor according to this invention facilitates all the Reed-Solomon decode processing.

It will thus be understood from the foregoing description that according to this invention, a practical Galois field arithmetic processor having a simple configuration capable of high speed operation is realized, and all the operations of the Reed-Solomon decode processing can be performed by the processor alone.

What is claimed is:

1. A Galois field arithmetic processor comprising:
   an instruction decoder providing an instruction for performing a Galois field arithmetic operation on a first operand which is vectorially expressed and a second operand which is exponentially expressed;
   an exponent-vector conversion circuit for converting said second operand from an exponential expression to a vectorial expression; and
   an arithmetic unit comprising a Galois field vector adder and a Galois field vector multiplier for executing a Galois field arithmetic operation on the first operand and the second operand.

2. A Galois field arithmetic processor according to claim 1, further comprising:
   a selector for selecting one of said second operand which is exponentially expressed and an output of said exponent-vector conversion circuit, and supplying a result of selection to said arithmetic unit as said second operand;
   wherein any one of said vectorially expressed data and said exponentially expressed data can be input as said second operand and an instruction is provided for performing the Galois field operation on both vectorially expressed operands.

3. A Galois field arithmetic processor according to claim 1:
   wherein said first operand and said second operand are input to said Galois field vector multiplier, and an output of said Galois field vector multiplier and a third operand are applied to the said Galois field vector adder.

4. A Galois field arithmetic processor according to claim 3, further comprising:
   a first arithmetic data selector for selecting one of said first operand and an output of said Galois field vector adder, and outputting the selected data to said Galois field vector multiplier as said first operand.

5. A Galois field arithmetic processor according to claim 3, further comprising:
   a third arithmetic data selector for selecting one of said third operand and the output of said Galois field vector adder, and outputting a result of the selecting to said Galois field vector adder as said third operand.

6. A Galois field arithmetic processor according to claim 5:
   wherein said operands have a data width of m×n (m, n: positive integers), said conversion circuit has n conversion circuits with a data width of m, said arithmetic unit uses n arithmetic operators with a data width of m, and n Galois field arithmetic operations with a data width of m can be carried out in parallel.

7. A Galois field arithmetic processor according to claim 6:
   wherein said conversion circuit is a memory having n banks configured with n memory units having a data width of m, said memory is accessible as n memory units, said memory being supplied with a common address and also accessible as a memory having a data width of m×n.

8. A Galois field arithmetic processor according to claim 3, further comprising:
   an accumulator temporarily holding an output of said Galois field vector adder.

9. A Galois field arithmetic processor according to claim 8, further comprising:
   a first data selector for selecting one of said first operand and an output of said accumulator and outputting a result of said selecting to said Galois field vector multiplier as said first operand.

10. A Galois field arithmetic processor according to claim 8, further comprising:
    a third data selector for selecting one of said third operand and an output of said accumulator and outputting said selected data to said Galois field vector adder as said third operand.

11. A Galois field arithmetic processor according to claim 1,
    wherein the operation is divided into a first stage for converting said second operand and a second stage, for processing in said arithmetic unit,
    said processor further comprising temporary registers for temporarily holding the data of said first and second stages;
    wherein said first and second stages are performed in parallel by pipelining.

12. A Galois field arithmetic processor according to claim 11, further comprising a feedback mechanism for feeding back the result of arithmetic operation as said second operand;
wherein said instruction decoder outputs control data for controlling said temporary registers, each of said selectors and said feedback mechanism;
the processor further comprising a control decision circuit adapted for transmitting said control data sequentially to each stage corresponding to each of said temporary registers, each of said selectors and said feedback mechanism, and determining whether said control data is the one for controlling the corresponding one of said temporary registers, the corresponding one of said selectors or said feedback mechanism thereby to control the corresponding temporary register, the corresponding selector or said feedback mechanism in accordance with the result of determination;
wherein said control data of said feedback mechanism includes a stage flag for indicating the presence or absence of the processing in said first stage, said control decision circuit corresponding to said second operand generates a control signal for bypassing said processing in said first stage in accordance with said stage flag.

13. A Galois field arithmetic processor according to claim 1:
wherein said operands have a data width of m×n (m, n: positive integers), said conversion circuit has n conversion circuits with a data width of m, said arithmetic unit uses n arithmetic operators with a data width of m, and n Galois field arithmetic operations with a data width of m can be carried out in parallel.

14. A Galois field arithmetic processor according to claim 13, further comprising:
a flag storage register storing an n-bit flag in continuous areas indicating that the result of arithmetic operation of n arithmetic operators having a data width of m is zero.

15. A Galois field arithmetic processor according to claim 13 having an operation data width of m×n, further comprising:
an accumulation flag calculating the logic sum of the output of said Galois field vector adder having a data width of m and the preceding output thereof and accumulating the zero flag; and
an intermediate copy register for storing at n points m arbitrary bit data indicated as an intermediate value of said second operand.

16. A Galois field arithmetic processor according to claim 13:
wherein said conversion circuit is a memory having n banks configured with n memory units having a data width of m, said memory is accessible as n memory units, said memory being supplied with a common address and also accessible as a memory having a data width of m×n.

17. A Galois field arithmetic processor according to claim 1, further comprising:
an accumulation flag calculating the logic sum of the output of said Galois field vector adder and the preceding output thereof and accumulating the zero flag.

18. A Galois field arithmetic processor comprising:
an instruction decoder providing an instruction for performing a Galois field arithmetic operation on a first operand which is exponentially expressed and a second operand which is vectorially expressed;
a vector-exponent conversion circuit for converting said second operand from a vectorial expression to an exponential expression; and
an arithmetic unit comprising a Galois field exponent adder-subtractor for executing the Galois field arithmetic operation on the first operand and the second operand.

19. A Galois field arithmetic processor according to claim 18, further comprising:
a selector selecting one of said vectorially expressed second operand and the output of said vector-exponent conversion circuit and supplying a result of selection to said arithmetic unit as said second operand;
wherein one of said exponentially expressed data and said vectorially expressed data can be input as said second operand and an instruction is provided for performing the Galois field operation on the two exponentially expressed data.

20. A Galois field arithmetic processor according to claim 18, further comprising:
a first input selector for selecting said first and second operands, and a second input selector for selecting said first and second operands.

21. A Galois field arithmetic processor according to claim 18, wherein the operation is divided into a first stage for converting said second operand and a second stage for processing in said arithmetic unit,
said processor further comprising temporary registers for temporarily holding the data of said first and second stages;
wherein said first and second stages are performed in parallel by pipelining.

22. A Galois field arithmetic processor according to claim 21, further comprising:
a feedback mechanism for feeding back the result of arithmetic operation as said second operand; and
wherein said instruction decoder outputs control data for controlling said temporary registers, each of said selectors and said feedback mechanism;
the processor further comprising a control decision circuit adapted for transmitting said control data sequentially to each stage corresponding to each of said temporary registers, each of said selectors and said feedback mechanism, and determining whether said control data is the one for controlling the corresponding one of said temporary registers, the corresponding one of said selectors or said feedback mechanism thereby to control the corresponding temporary register, the corresponding selector or said feedback mechanism in accordance with the result of determination;
wherein said control data of said feedback mechanism includes a stage flag for indicating the presence or absence of the processing in said first stage, said control decision circuit corresponding to said second operand generates a control signal for bypassing said processing in said first stage in accordance with said stage flag.

23. A Galois field arithmetic processor comprising:
an arithmetic unit comprising a Galois field adder, a Galois field vector multiplier and a Galois field exponent adder-subtractor for executing the Galois field arithmetic operation on a first operand and a second operand; and
an instruction decoder providing an instruction for performing the Galois field arithmetic operation on an exponentially expressed operand and a vectorially expressed operand.

24. A Galois field arithmetic processor according to claim 23, further comprising:
an exponent-vector conversion circuit for converting said second operand from an exponential expression to a vectorial expression; and
a vector-exponent conversion circuit for converting said second operand from a vectorial expression to an exponential expression;
the instruction provided to the instruction decoder for performing the Galois field operation on the operands have alternate vectorial and exponential expressions.

25. A Galois field arithmetic processor according to claim 24, further comprising:
a selector for selecting one of said second operand before conversion, the output of said exponent-vector conversion circuit and the output of said vector-exponent conversion circuit, and supplying the result of selection to said arithmetic unit as said second operand;
wherein one of said vectorially expressed data and said exponentially expressed data can be input as said second operand.

26. A Galois field arithmetic processor according to claim 25, further comprising:
a first input selector for selecting said first and second operands and a second input selector for selecting said first and second operands;
wherein a division instruction is provided by the vectorially expressed input data.

27. A Galois field arithmetic processor according to claim 23,
wherein the operation is divided into a first stage for converting said second operand and a second stage for processing in said arithmetic unit,
said processor further comprising temporary registers for temporarily holding the data of said first and second stages;
wherein said first and second stages are performed in parallel by pipelining.

28. A Galois field arithmetic processor according to claim 27, further comprising:
a feedback mechanism for feeding back the result of arithmetic operation as said second operand; and
wherein said instruction decoder outputs the control data for controlling said temporary registers, each of said selectors and said feedback mechanism;
the processor further comprising a control decision circuit adapted for transmitting said control data sequentially to each stage corresponding to each of said temporary registers, each of said selectors and said feedback mechanism, and determining whether said control data is the one for controlling the corresponding one of said temporary registers, the corresponding one of said selectors or said feedback mechanism thereby to control the corresponding temporary register, the corresponding selector or said feedback mechanism in accordance with the result of determination;
wherein said control data of said feedback mechanism includes a stage flag for indicating the presence or absence of the processing in said first stage, said control decision circuit corresponding to said second operand generates a control signal for bypassing said processing in said first stage in accordance with said stage flag.

29. A Galois field arithmetic processor according to claim 24:
wherein said first and second operands have a data width of m×n (m, n: positive integers), said conversion circuits have n conversion circuits with a data width of m, said arithmetic unit uses n arithmetic operators with a data width of m, and n Galois field arithmetic operations with a data width of m can be carried out in parallel.

30. A Galois field arithmetic processor according to claim 29, further comprising:
a flag storage register storing a n-bit flag in continuous areas indicating that the result of arithmetic operation of n arithmetic operators having a data width of m is zero.

31. A Galois field arithmetic processor according to claim 29 having an operation data width of m×n, further comprising:
an accumulation flag for calculating the logic sum of the output of said Galois field vector adder having a data width of m and the preceding output thereof and accumulating the zero flag; and
an intermediate copy register for storing at n points m arbitrary bit data indicated as an intermediate value of said second operand.

32. A Galois field arithmetic processor according to claim 29:
wherein said conversion circuit is a memory having n banks configured with n memory units having a data width of m, said memory is accessible as n memory units, said memory being supplied with a common address and also accessible as a memory having a data width of m×n.

33. A Galois field arithmetic processor according to claim 23, further comprising:
an accumulation flag calculating the logic sum of the output of said Galois field vector adder and the preceding output thereof and accumulating the zero flag.

34. A Galois field arithmetic processor comprising:
an arithmetic unit comprising a Galois field vector adder, a Galois field vector multiplier and a Galois field exponential adder-subtractor;
an exponent-vector conversion circuit for converting data from an exponential expression to a vectorial expression; and
a vector-exponent conversion circuit for converting data from a vectorial expression to an exponential expression;
an instruction decoder providing an instruction for executing on the arithmetic unit a Galois field operation on the vectorially expressed input data and the exponentially expressed input data, and the exponential expression $2^m-1$ and the vectorial expression 0 correspond to each other, data sent to the arithmetic unit is processed using either or both of the conversion circuits.

35. A Galois field arithmetic processor according to claim 34, wherein said Galois field exponent adder-subtractor outputs $2^m-1$ when the input is $2^m-1$.

36. A Galois field arithmetic processor comprising:

an instruction decoder;

an arithmetic unit comprising a first Galois field vector multiplier having the two inputs thereof supplied with a first operand and a second Galois field vector multiplier having one input thereof supplied with said first operand and the other input thereof supplied with a result of arithmetic operation;

a one-bit shifter for counting a number of times indicated by a second operand;

an accumulator temporarily holding an output of said second Galois field vector multiplier and supplying said output constituting the result of arithmetic operation to the other input of said second Galois field vector multiplier;

a first input selector selecting said first operand and an output of said first Galois field vector multiplier; and a second input selector for selecting said second operand and an output of said one-bit shifter and outputting a result of selection as said second operand.

37. Galois field arithmetic processor according to claim 36, wherein said first and second operands, said accumulator and said first and second input selectors have a data width of m×n (m, n: positive integers); and wherein said arithmetic unit uses n first Galois field vector multipliers and n second Galois field vector multipliers having a data width of m.

38. A Galois field arithmetic processor according to claim 36, a source element α of a vectorial expression is input as said first operand, and an exponent p is input as said second operand, so that a converter can convert exponentially expressed data into a vectorially expressed data which is input into the arithmetic unit.

* * * * *